(12) United States Patent
Kovach et al.

(10) Patent No.: US 10,898,756 B2
(45) Date of Patent: Jan. 26, 2021

(54) SYSTEM AND METHOD FOR TRACKING MOVEMENT

(71) Applicant: Under Armour, Inc., Baltimore, MD (US)

(72) Inventors: F. Grant Kovach, Baltimore, MD (US); Jeffrey Allen, Baltimore, MD (US)

(73) Assignee: Under Armour, Inc., Baltimore, MD (US)

( * ) Notice: Subject to any disclaimer, the term of this patent is extended or adjusted under 35 U.S.C. 154(b) by 372 days.

(21) Appl. No.: 15/730,083

(22) Filed: Oct. 11, 2017

(65) Prior Publication Data

US 2019/0105535 A1   Apr. 11, 2019

(51) Int. Cl.
*A63B 24/00* (2006.01)
*A43B 3/00* (2006.01)

(52) U.S. Cl.
CPC ........ *A63B 24/0021* (2013.01); *A43B 3/0005* (2013.01); *A63B 2024/0025* (2013.01); *A63B 2220/62* (2013.01); *A63B 2220/836* (2013.01)

(58) Field of Classification Search
CPC combination set(s) only.
See application file for complete search history.

(56) References Cited

U.S. PATENT DOCUMENTS

| | | | |
|---|---|---|---|
| 5,899,963 A * | 5/1999 | Hutchings | A43B 3/0005 700/14 |
| 6,549,845 B2 | 4/2003 | Eakle, Jr. et al. | |
| 6,826,477 B2 | 11/2004 | Ladetto et al. | |
| 8,224,618 B2 | 7/2012 | Cattin et al. | |
| 8,355,888 B2 | 1/2013 | Chernoguz et al. | |
| 8,498,811 B2 | 7/2013 | Lundquist et al. | |
| 8,812,030 B2 | 8/2014 | Gum et al. | |
| 9,161,172 B2 | 10/2015 | Poduri et al. | |
| 9,175,963 B2 | 11/2015 | Kelly | |
| 9,258,675 B2 | 2/2016 | Smith et al. | |
| 9,538,498 B2 | 1/2017 | Smith et al. | |
| 9,568,323 B2 | 2/2017 | Li et al. | |
| 10,194,714 B2 * | 2/2019 | McGinnity | A43B 23/027 |
| 2009/0066569 A1 | 3/2009 | Hunter et al. | |
| 2009/0138200 A1 | 5/2009 | Hunter et al. | |
| 2011/0054836 A1 * | 3/2011 | Foxlin | G01C 21/165 702/150 |
| 2012/0102784 A1 * | 5/2012 | Buder | A43B 3/0005 36/83 |
| 2013/0130843 A1 | 5/2013 | Burroughs et al. | |

(Continued)

OTHER PUBLICATIONS

DC Rainmaker, Hands-on: The New Suunto 9 Multisport GPS Watch, on-line article, Jun. 5, 2018, available at: https://www.dcrainmaker.com/2018/06/hands-on-the-new-suunto-9-multisport-gps-watch.html (20pages).

*Primary Examiner* — Jennifer E Simmons
(74) *Attorney, Agent, or Firm* — Law Office of Mark Wang, P.O.

(57) ABSTRACT

A shoe includes: a heel portion; a toe portion; a sole portion; and an electrical assembly. The electrical assembly includes at least: a magnetometer configured to determine a direction of movement of the shoe; and an accelerometer configured to determine acceleration of the shoe. Direction and acceleration data are used to generate a display of a map indicating traversal of a route by a wearer of the shoe at user interface of a user device.

17 Claims, 9 Drawing Sheets

102 – Shoe
602 – Smart Phone
604 – Direction Data
606 – Acceleration Data

(56) References Cited

U.S. PATENT DOCUMENTS

| | | |
|---|---|---|
| 2014/0201126 A1 | 7/2014 | Zadeh et al. |
| 2014/0302852 A1 | 10/2014 | Ostergaard et al. |
| 2016/0075245 A1* | 3/2016 | Logvinov ............... B60L 53/38 320/108 |
| 2016/0121164 A1 | 5/2016 | Coza et al. |
| 2016/0123738 A1 | 5/2016 | Bellusci et al. |
| 2016/0180440 A1* | 6/2016 | Dibenedetto ........... G06F 19/34 705/26.7 |
| 2016/0278652 A1 | 9/2016 | Kaib et al. |
| 2016/0335913 A1 | 11/2016 | Grant et al. |
| 2017/0219359 A1 | 8/2017 | Elhoushi et al. |
| 2017/0354348 A1* | 12/2017 | Winter ................... A61B 5/112 |

\* cited by examiner

102 – Shoe
104 – Heal
106 – Sole
108 – Toe
110 – Electrical Assembly
112 – X Axis
114 – Z Axis
116 – Y Axis 102 – Shoe
402 – User

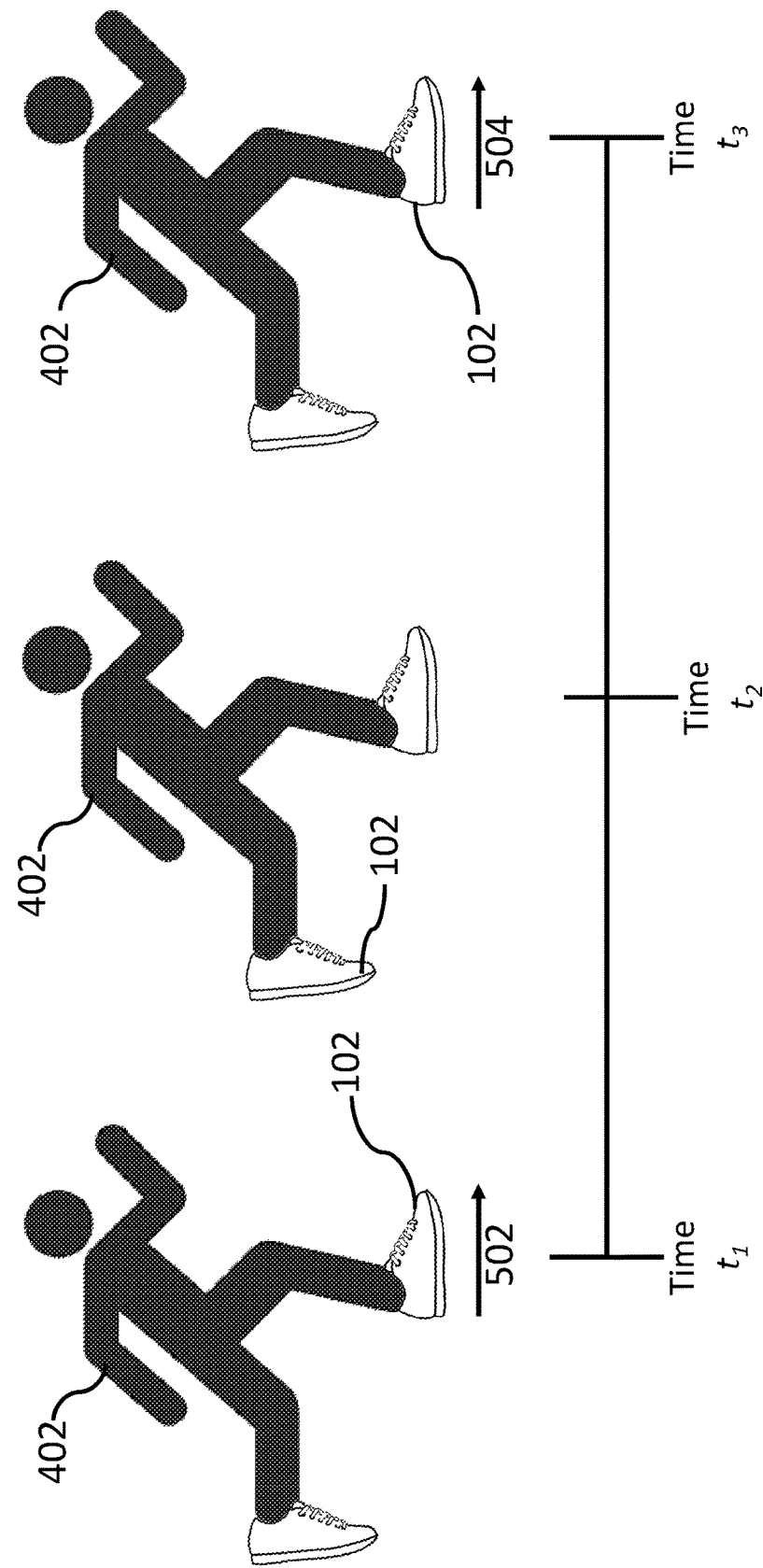

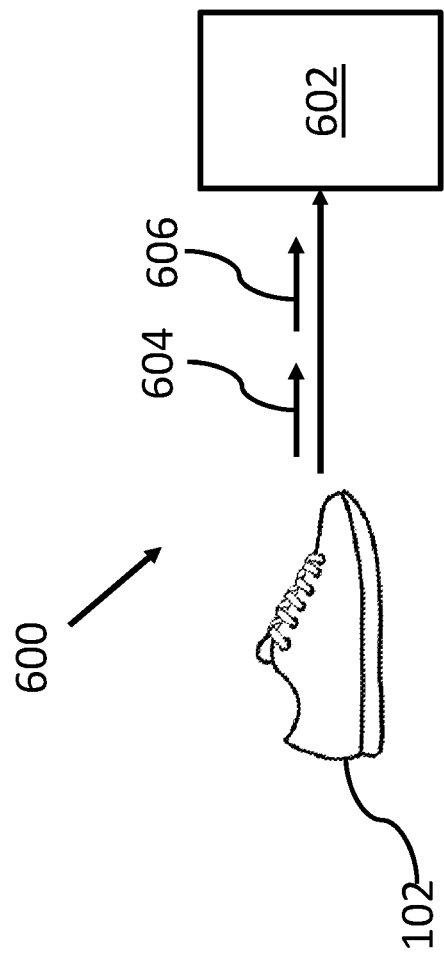

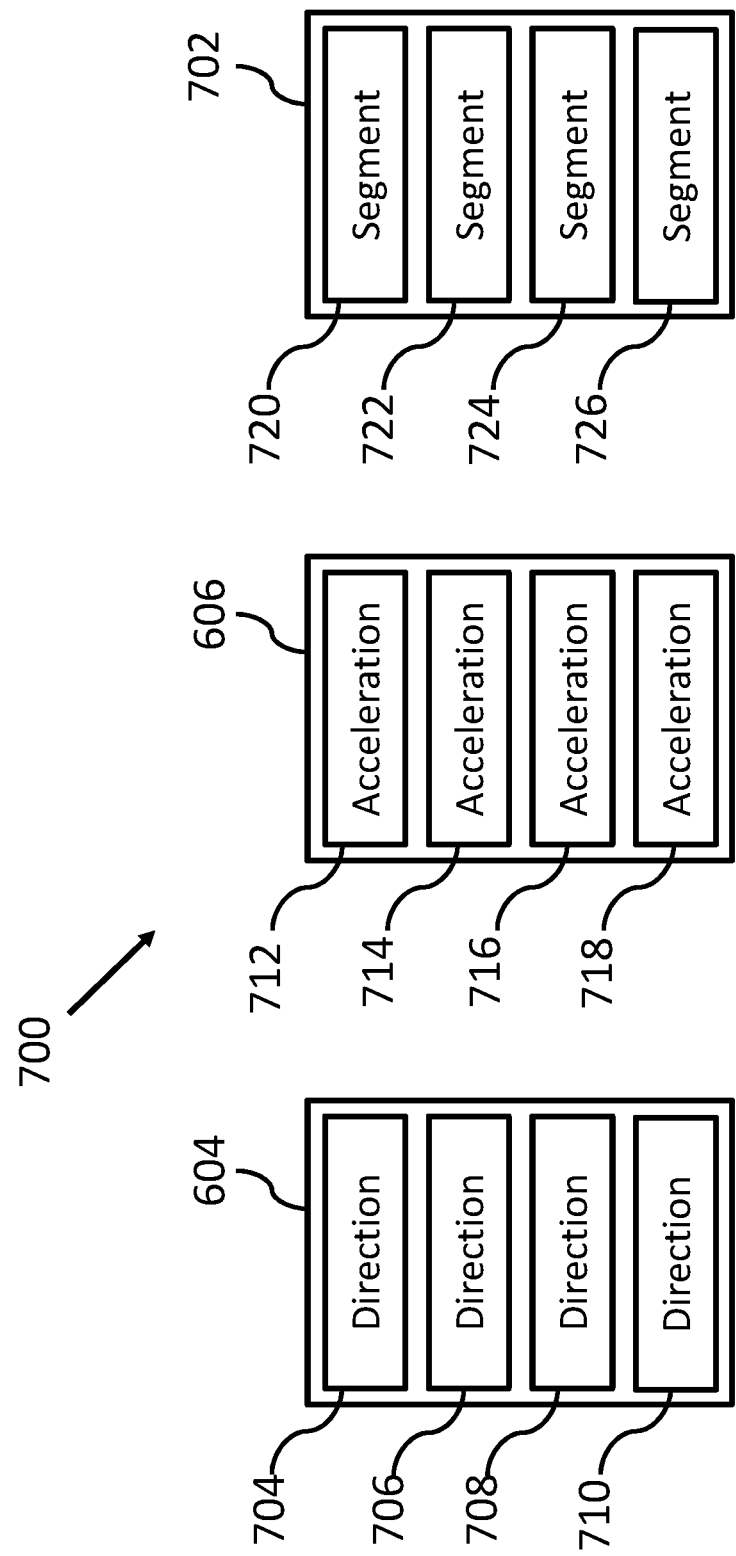

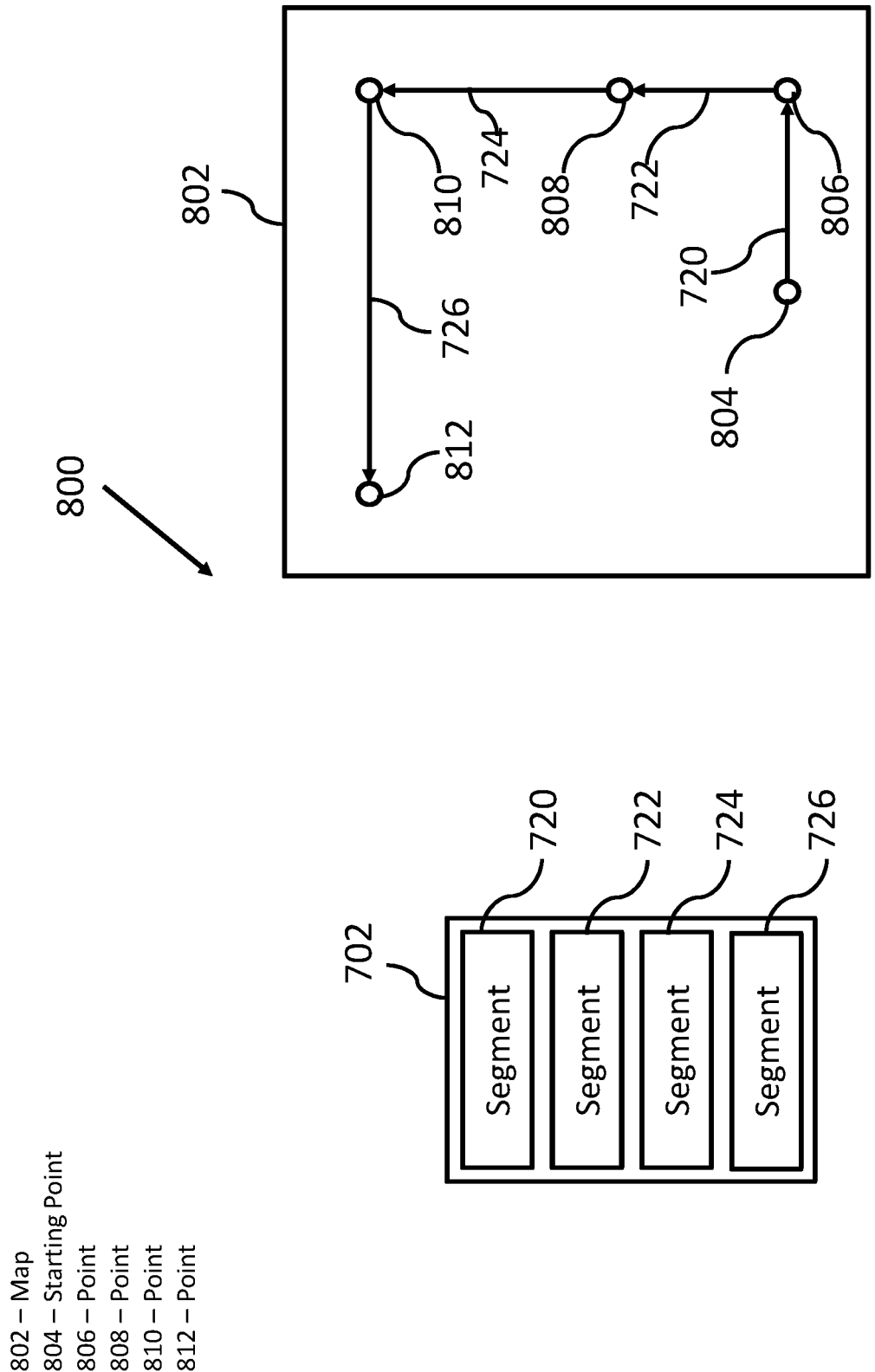

SYSTEM AND METHOD FOR TRACKING MOVEMENT

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

The present invention generally relates to tracking a user's workout.

There exists a need for a device and method to use an electronic system in a shoe in order to provide untethered tracking of a user's workout.

BRIEF SUMMARY OF THE DRAWINGS

The accompanying drawings, which are incorporated in and form a part of the specification, illustrate example embodiments and, together with the description, serve to explain the principles of the invention. In the drawings:

FIG. 5 illustrates an accelerometer tracking the acceleration of a user in accordance with aspects of the present invention;

FIG. 6 illustrates a shoe transmitting tracked movement data of a user to an electronic device in accordance with aspects of the present invention;

FIG. 7 illustrates an electronic device processing data in accordance with aspects of the present invention; and FIG. 8 illustrates an electronic device creating a map in accordance with aspects of the present invention.

All Figures ©Under Armour, Inc. 2017. All rights reserved.

DETAILED DESCRIPTION

Overview

A shoe includes: a heel portion; a toe portion; a sole portion; and an electrical assembly. The electrical assembly includes at least: a magnetometer configured to determine a direction of movement of the shoe; and an accelerometer configured to determine acceleration of the shoe. Direction and acceleration data are used to generate a display of a map indicating traversal of a route by a wearer of the shoe at user interface of a user device.

These and other aspects of the disclosure shall become apparent when considered in light of the disclosure provided herein.

Example Embodiments

Aspects of the present invention are drawn to a system and method for using an accelerometer and magnetometer in a shoe in order to provide untethered tracking of a user's workout by monitoring the user's movement while running (or walking or jogging).

Generally, in order to track a user's movement while running, an electronic device having Global Positioning System (GPS) capabilities, such as a smart phone, is required. Carrying an electronic device in order to track a user's movement while running is quite cumbersome, as it must be carried for the duration of the run. There are several other disadvantages associated with carrying a smart phone while running, such as the detriment to a user's form and potential harm to the device. The fact that a person can only carry so many thing while running and that tracking a run may come at the cost of carrying something else important, such as a water bottle or keys. Additionally, if a smart phone or other electronic device is dropped while running, it may be quite expensive to replace.

In accordance with aspects of the present invention, an accelerometer, magnetometer, and transceiver are disposed in a shoe that is worn by a user while running in order to provide untethered tracking of the user's movement.

The accelerometer and magnetometer in the shoe are able to track the acceleration and direction of a user while they are running, this information may be used to eliminate the need for a GPS device, which in turn, eliminates the need for the user to carry a smart device. Once the user is finished running, they can use an electronic device at their convenience to retrieve the acceleration and direction data collected during their run through the transceiver in the shoe. In one embodiment, their route may be overlaid on a map for viewing. Accordingly, the user is able to track their movement while remaining untethered.

Aspects of the present invention will now be described with reference to FIGS. 1-5.

Figure 1:
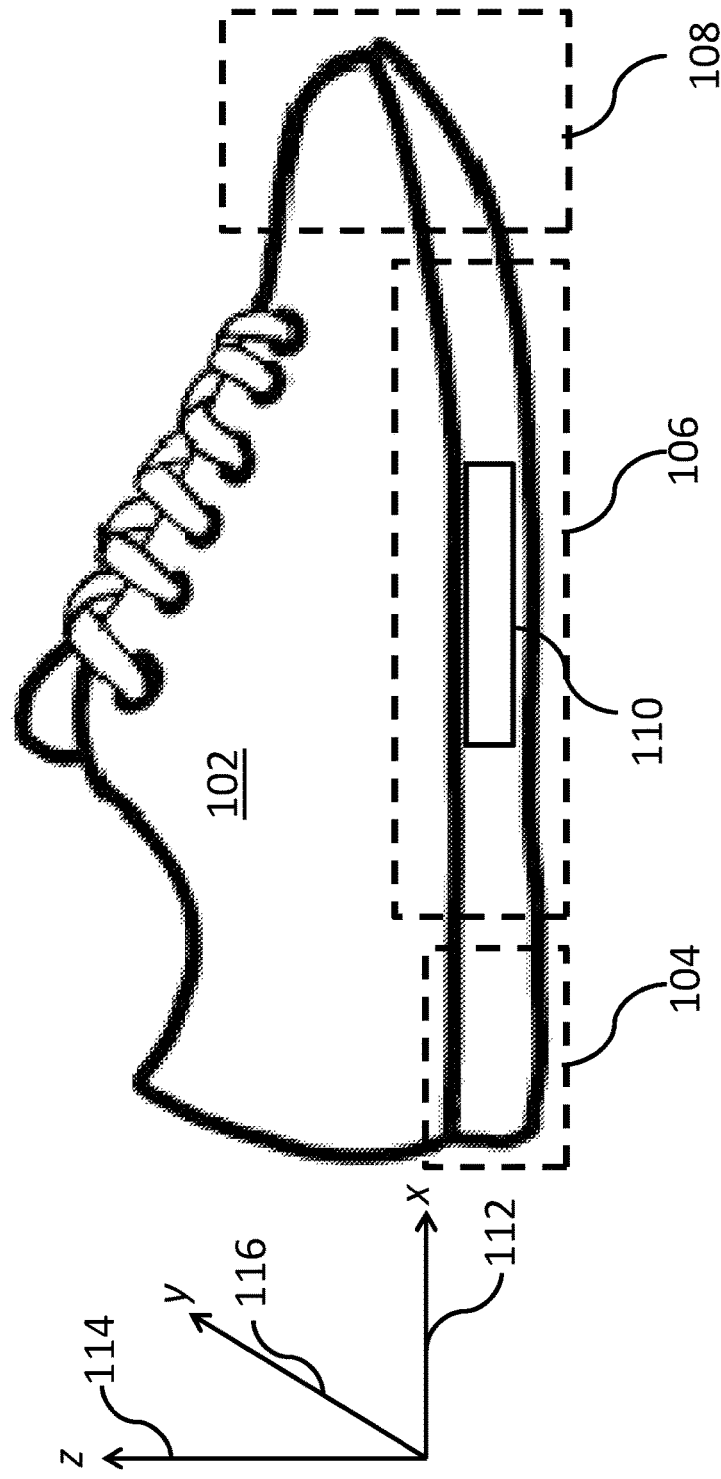
FIG. 1 illustrates a shoe in accordance with aspects of the present invention.

FIG. 1 illustrates a shoe 102 in accordance with aspects of the present invention.

FIG. 1 includes shoe 102 having an x-axis 112, a z-axis 114, and a y-axis 116. Shoe 102 further includes a heel portion 104, a sole portion 106, a toe portion 108, and an electrical assembly 110.

Heel portion 104 is separated from sole portion 106 and is arranged along x-axis 112. Sole portion 106 is disposed from heel portion 104 to toe portion 108 and is arranged along x-axis 112 and disposed between heel portion 104 and toe portion 108. Toe portion 108 is arranged along x-axis 112 a distance from heel portion 104.

Electrical assembly 110 is disposed within sole portion 106. Electrical assembly 110 is operable to track acceleration and movement data related to a user's run.

X-axis 112 is disposed along the forward direction of a user wearing shoe 102. Z-axis 114 is disposed along the normal of sole portion 106. Y-axis 116 is disposed perpendicularly to the plane created by x-axis 112 and z-axis 114.

The operation of electrical assembly 110 will now be discussed with additional reference to FIG. 2.

Figure 2:
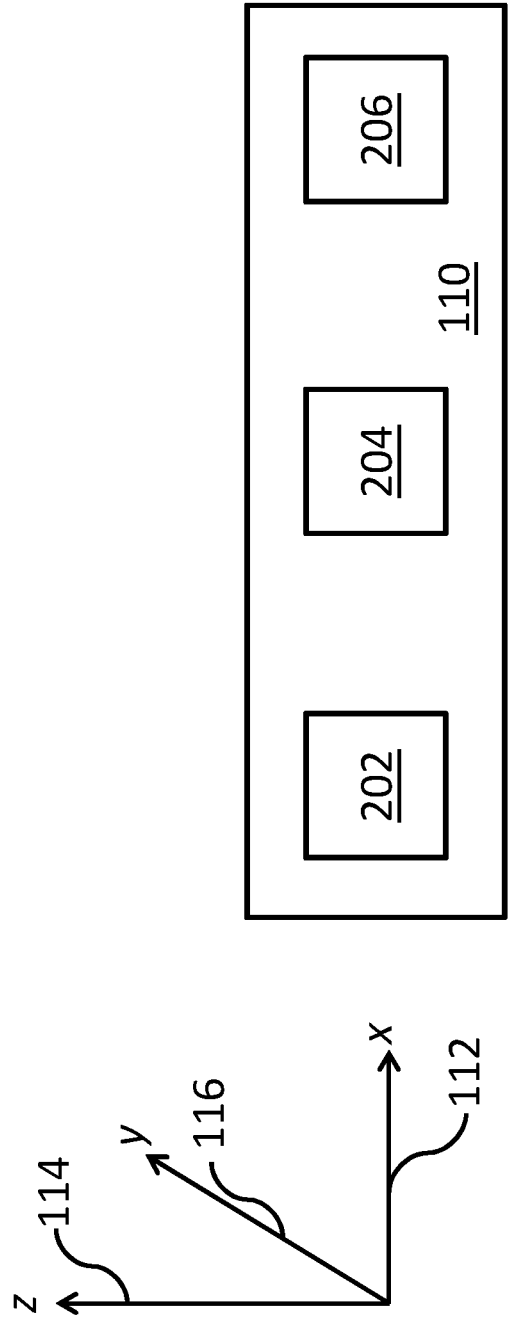
FIG. 2 illustrates a block diagram of an electrical assembly in accordance with aspects of the present invention.

FIG. 2 illustrates an exploded view of electrical assembly 110 in accordance with aspects of the present invention.

FIG. 2 includes x-axis 112, z-axis 114, y-axis 116, and electrical assembly 110. Electrical assembly 110 includes a magnetometer 202, an accelerometer 204, and a transceiver 206.

Magnetometer 202 is operable to determine a direction of movement based on a detected magnetic field. Magnetometer 202 is additionally operable to detect a change in the direction of movement based on a change detected in a magnetic field along y-axis 116. Magnetometer 202 is further operable to generate supination and pronation data based on a detected magnetic field within the plane of x-axis 112 and z-axis 114.

Since the magnetic flux density in air is directly proportional to magnetic field strength, magnetometer 202 is capable of detecting fluctuations in Earth's magnetic field. As a result, magnetometer 202 is able to relate the magnetic flux passing through y-axis 116 in order to determine its orientation relative to Earth's magnetic north pole. When shoe 102 is contacting the ground, z-axis 114 always points upwards towards the sky. With this information, the direction of travel along x-Axis 112 can easily be determined due to the perpendicularity of x-axis 112, z-axis 114, and y-axis 116.

Accelerometer 204 is operable to determine acceleration. Accelerometer 204 is additionally operable to detect a ground contact when shoe 102 of FIG. 1 contacts the ground as a result of the detection of a large impulse of acceleration. Accelerometer 204 is operable to generate a ground contact signal based on the detected ground contact acceleration when shoe 102 contacts the ground.

Transceiver 206 is operable to transmit the direction data associated with magnetometer 202 and acceleration data associated with accelerometer 204 to an electronic device (not shown). The electronic device may comprise any computerized apparatus associated to the wearer of the shoe 102. Non limiting examples of exemplary electronic devices include e.g., smart phones, tablets, laptop and desktop computers, smart watches, etc.

An example method 300 for determining and tracking a user's movement while running will now be described with additional reference to FIGS. 3-6.

Figure 3:
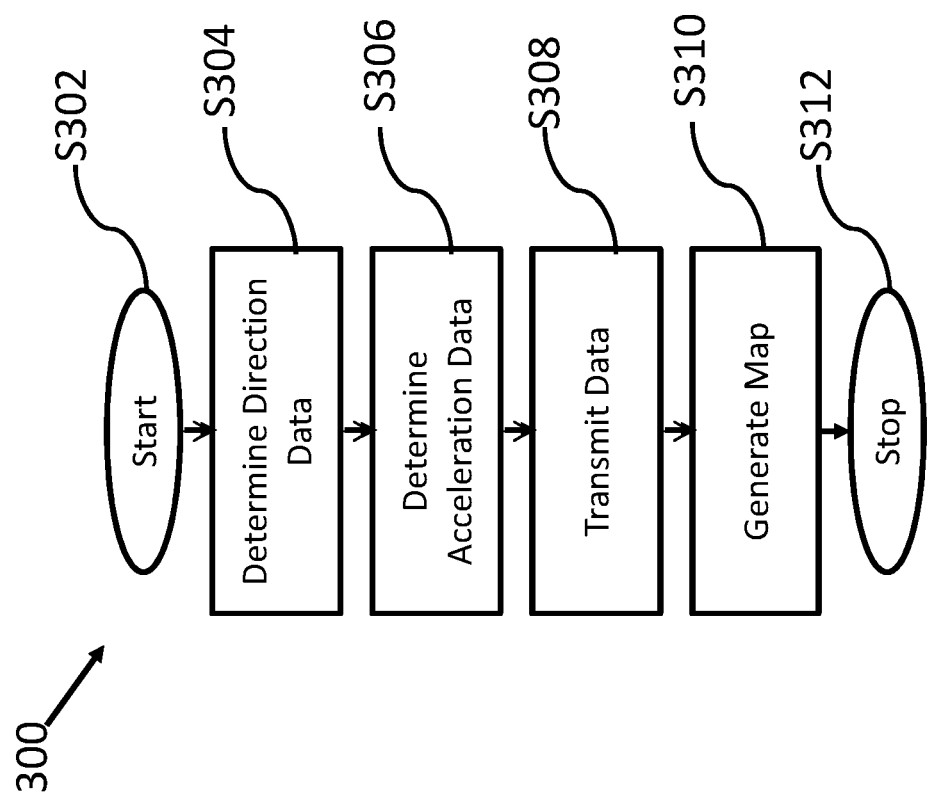
FIG. 3 illustrates a flowchart of an example method of the operation of a shoe in accordance with aspects of the present invention.
Figure 4A:
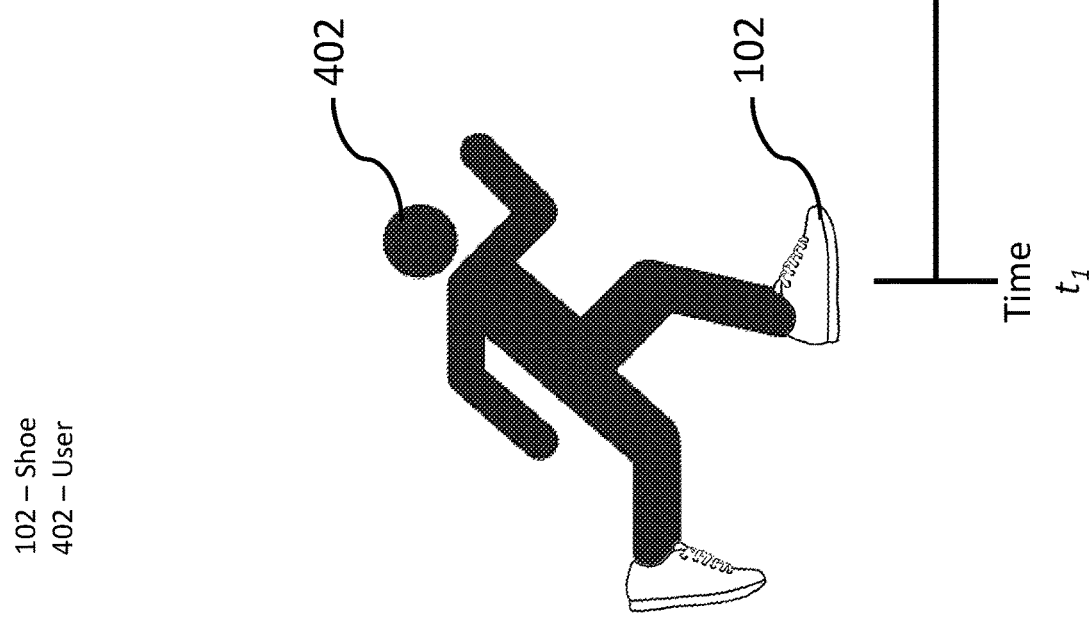
FIG. 4A illustrates a magnetometer tracking the direction of movement at a first time of a user in accordance with aspects of the present invention.

As shown in FIG. 3, method 300 starts (S302), and direction data is determined (S304). For example, as shown in FIG. 4A suppose that a user wants to track their movements while running using shoe 102. To begin, at time $t_1$ user 402 puts on shoe 102 and begins running Referring back to FIG. 2, when user 402 begins running, magnetometer 202 determines the initial direction of user 402 based on the detected magnetic field. Suppose that in this example, magnetometer 202 determines that the detected magnetic field lies along y-axis 116 and points towards the north.

Once the magnetometer has determined the direction the magnetic field points along y-axis 116, the orientation of x-axis 112 and z-axis 114 can be determined. Since z-axis 114 is always normal to sole portion 106 of shoe 102, it points upwards towards the sky. Due to the orthogonality of the axes, magnetometer 202 is able to determine that x-axis 112 points in the eastward direction as described above in FIG. 2.

Since x-axis 112 lies along the forward direction of user 402, x-axis 112 must also lie in the eastward direction. At this time, magnetometer 202 will continue to monitor the magnetic field detected along y-axis 116 and user 402 continues to run in an eastward direction. Once the direction of user 402 is determined, magnetometer 202 stores the direction data to be used at a later time. The data is timestamped for easy correlation to other data (as discussed below).

Figure 4B:
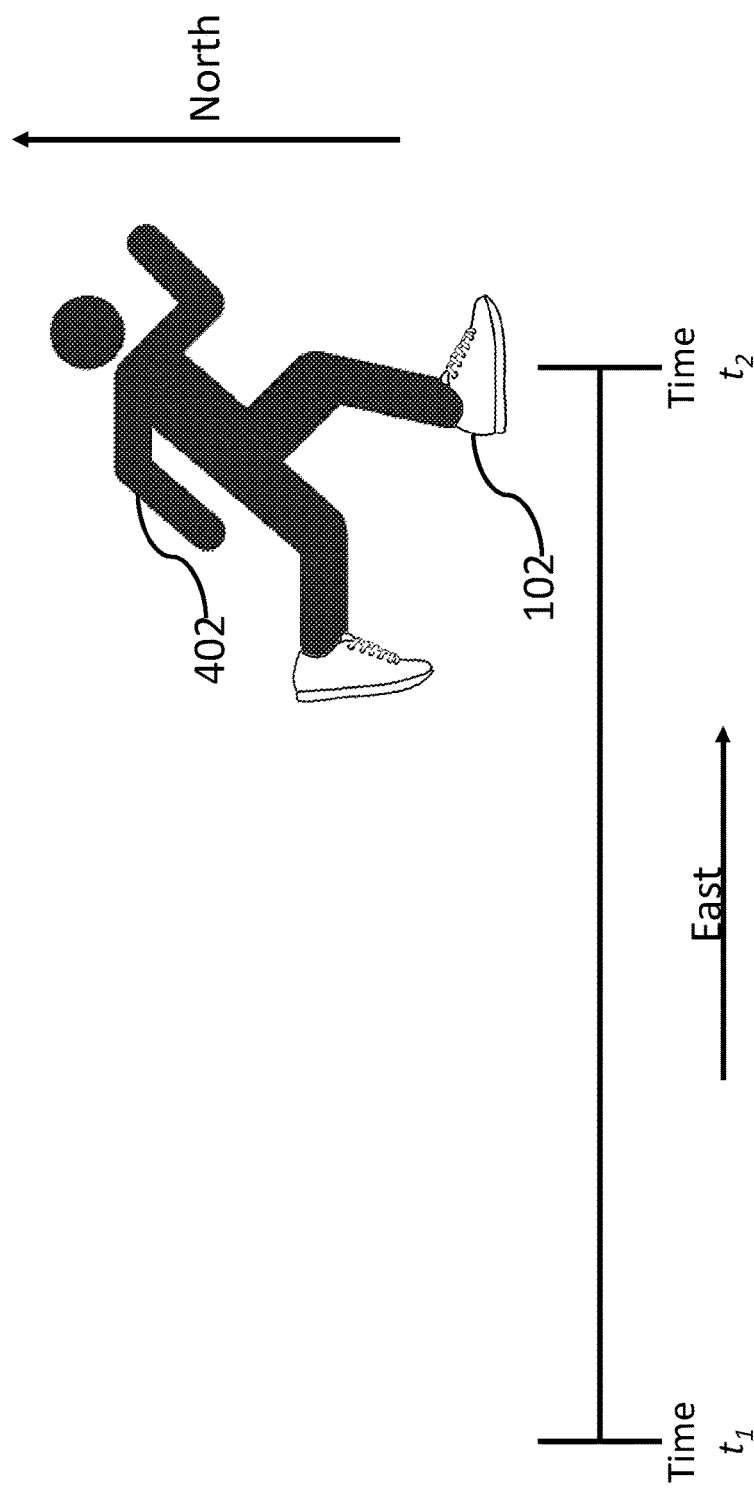
FIG. 4B illustrates a magnetometer tracking the direction of movement at a second time of a user in accordance with aspects of the present invention

Referring to FIG. 4B, at time $t_2$, user 402 turns and begins running in a northward direction. Due to the turn made by user 402, magnetometer 202 detects a change in the magnetic field along y-axis 116. At this time, magnetometer 202 detects that the magnetic field lies perpendicular to y-axis 116. As described above, due to the orientation of each of the axes of shoe 102, magnetometer 202 determines that user 402 is running in the northward direction.

At this point, the magnetometer continues to use the detected magnetic field in order to determine that direction in which the user is running. In this example embodiment, the direction data determined by magnetometer 202 only includes the direction of travel of user 402. In other embodiments, magnetometer 202 may also detect supination or pronation data based on the plane created by x-axis 112 and z-axis 114.

If shoe 102 moves out of plane created by x-axis 112 and z-axis 114, it is due to the rotation or the user's foot inward or outward, known as pronation or supination. There is naturally a bit of supination and pronation in the gait cycle when running or walking, but too much may lead to injuries or damage to various parts of the foot over the long term.

Creating supination and pronation data may allow a user to prevent injuries or unnatural wear on their joints by taking action to correct any excessive supination or pronation that may occur while running or walking.

In order to utilize the direction data obtained by the magnetometer, the acceleration data in a given direction must also be determined, which will now be further described with additional reference to FIG. 5.

Returning to FIG. 3, after direction data is determined, acceleration data is determined (S306). For example, as shown in FIG. 5, suppose that user 402 has begun running and that they take their first step at time $t_1$ when shoe 102 contacts the ground. Briefly referring back to FIG. 1, when shoe 102 contacts the ground, sole portion 106 and electrical assembly 110 lie along x-axis 112 and z-axis 114 is normal to the ground, sole portion 106, and electrical assembly 110.

Referring to FIG. 2, as user 402 takes a step, accelerometer 204 detects acceleration towards the ground along z-axis 114. Once shoe 102 contacts the ground, accelerometer 204 detects a large change in acceleration along z-axis 114 as shoe 102 stops moving downward. Accelerometer 204 registers the large change in acceleration along z-axis 114 as a step begin taken and generates a ground contact signal 502.

At this time, after contacting the ground with shoe 102, accelerometer 204 detects the acceleration of shoe 102 as user 402 continues taking a step until time $t_2$. At time $t_2$, user 402 has contacted the ground at with their other foot and accelerometer 204 has continually detected acceleration of shoe 102.

As user 402 contacts the ground with their other foot, they begin to raise shoe 102 in preparation for taking another step, which is detected as an acceleration along z-axis 114 by accelerometer 204. After contacting the ground with their foot, user 402 begins to their foot and shoe 102 forward to take another step. At time $t_3$, shoe 102 contacts the ground, and user 402 has completed their step.

Once shoe 102 contacts the ground, accelerometer 204 detects the change in acceleration along z-axis 114 and generates ground contact signal 504. Once ground contact signal 504 is generated, accelerometer 204 has enough information in order to generate acceleration data in order to track the movement of user 402.

Once two ground contact signals are generated, the accelerometer is able to generate acceleration data related to the movement of the user. By using the acceleration between the two ground contact signals, a velocity can be calculated. And once velocity is known, a distance traveled can easily be determined for a given step.

After user 402 completes their step, accelerometer 204 stores the acceleration data associated with step to be used at a later time. The acceleration data is time stamped so as to be correlated to the direction data discussed above. In this example embodiment, the data stored by accelerometer 204 is the average acceleration between each and total time between ground contact signal 502 and ground contact signal 504. For each new ground contact signal that is generated, accelerometer 204 will continue to track and store related acceleration data between the new ground contact signal and the previous ground contact signal.

Once user 402 has completed their run, they will want to details about their run such as distance, time, and location. In order to get this information, they will need to retrieve the movement data from shoe 102. Shoe 102 transmitting movement data will now be discussed with reference to FIG. 6.

FIG. 6 illustrates a transmission system 600 in accordance with aspects of the present invention.

As shown in the figure, transmission system 600 includes shoe 102 and electronic device 602.

Electronic device 602 is operable to wirelessly communicate with transceiver 206 of shoe 102. In this non-limiting example embodiment electronic device 602 is a smart phone and hereafter will be referred to as smart phone 602. In other example embodiments, electronic device 602 may be a desktop or laptop computer, or tablet.

Returning to FIG. 3, after direction data and acceleration data are determined, the data is transmitted (S308). For example, as shown in FIG. 6, once user 402 finishes their run, they use smart phone 602 to connect to transceiver 206 of shoe 102. Once connected, transceiver 206 transmits the movement data stored by magnetometer 202 as movement data 604 and the acceleration data stored by accelerometer 204 as acceleration data 606.

Movement data 604 and acceleration data 606 contain all of the detected directions and acceleration data that were tracked during the run of user 402. At this time, movement data 604 and acceleration data 606 must be processed by smart phone 602 in order to display it for user 402. For example, smart phone 602 may use direction and acceleration data to generate a display of a map indicating traversal of a route by user 402 of shoe 102. In an example embodiment, the direction and acceleration data may be used to determine distance traveled per stride, which is then used to generate the display of the map.

The processing of data by smart phone 602 will now be further discussed with additional reference to FIGS. 7-8.

FIG. 7 illustrates a data processing system 700 in accordance with aspects of the present invention.

As shown in the figure, processing system 700 includes direction data 604, acceleration data 606, and segment data 702. Direction data 604 further includes direction chunk 704, direction chunk 706, direction chunk 708, and direction chunk 710. Acceleration data 606 further includes acceleration chunk 712, acceleration chunk 714, acceleration chunk 716, and acceleration chunk 718. Segment data 702 further includes segment chunk 720, segment chunk 722, segment chunk 724, and segment chunk 726.

Returning to FIG. 3, after direction data and acceleration data are transmitted, the data must be processed (S310). For example, referring to FIG. 7, once received, smart phone 602 must process direction data 604 and acceleration data 606 in order to generate information, such as a map, for user 402.

In order to generate a map, smart phone 602 uses each data point within direction data 604 and acceleration data 606 in order to generate a segment chunk. To begin, smart phone 602 evaluates direction chunk 704 and acceleration chunk 712 in order to generate segment chunk 720. Suppose that in this example, that direction chunk 704 indicates that user 402 was running east and that acceleration chunk 712 indicates that user 402 was running with an acceleration of 2 m/s$^2$ for 1 second. Based on this information, smart phone 602 generates segment chunk 720, which indicates that user 402 ran east for a distance of 1 meter.

Once segment chunk 720 is generated, it is stored within segment data 702. Next, smart phone 602 continues generating segments by processing direction chunk 706 and acceleration chunk 714. Suppose that in this example, that direction chunk 704 indicates that user 402 turned and began running north and that acceleration chunk 714 indicates that user 402 was running with an acceleration of 2 m/s$^2$ for 1 second. Based on this information, smart phone 602 generates and stores segment chunk 720, which indicates that user 402 ran north for a distance of 1 meter.

Smart phone 602 will continue generating segment chunks until all of the direction data and acceleration data has been processed. Next, smart phone 602 generates segment chunk 724 based on direction chunk 708 and acceleration chunk 716 and generates segment chunk 726 based on direction chunk 710 and acceleration chunk 718. Suppose that in this example, segment chunk 724 indicates that user 402 ran north for 1.5 meters and that segment chunk 726 indicates that user 402 ran west for 2 meters.

After all of the direction data and acceleration data has been processed in order to create segment data 702, smart phone 602 must use segment data 702 in order to generate a map. Smart phone 602 using segment data 702 to generate a map will now be discussed with reference to FIG. 8.

FIG. 8 illustrates the system 800 used to generate a map in accordance with aspects of the present invention.

As illustrated in the figure, system 800 includes segment data 702, a map 802, a starting point 804, a point 806, a point 808, a point 810, and a point 812.

In this example, map 802 is provided on a user interface of system 800, for example a screen on smart phone 602. In operation, once segment data 702 has been generated, it may be used by smart phone 602 to generate map 802. To begin, smart phone 602 evaluates the first segment chunk of segment data 702, which is segment chunk 720. Smart phone 602 then draws a line from starting point 804 to point 806 based on segment chunk 720. In this example embodiment, smart phone 602 point 806 is 1 meter east of starting point 804.

Next, smart phone 602 draws a line from point 806 to point 808 based on segment chunk 722. In this example embodiment, point 808 is 1 meter north of point 806. Smart phone continues to draw lines between each successive point based on the next segment chunk to be processed. In this example embodiment, point 810 is 1.5 meters north of point 808 and point 812 is 2 meters west of point 810. In this manner, smart phone 602 is able to generate a route based on direction data 602 created by magnetometer 202 and acceleration data 604 created by accelerometer 204.

The apparatus and methods described above may be utilized in the herein-described practical applications.

A shoe may be provided comprising a heel, a toe, a sole, and an electrical assembly. The electrical assembly may comprise a magnetometer configured to determine a direction of movement of the shoe and an accelerometer configured to determine acceleration of the shoe, such as are provided in the discussion above. Using the methods and apparatus discussed herein, the direction and acceleration data are used to generate a display of a map indicating traversal of a route by a wearer of the shoe at user interface of a user device. In one variant, the electrical assembly further comprises a transceiver apparatus to wirelessly transmit the direction and acceleration data to the user device. The user device may utilize the direction and acceleration data to determine a distance travelled per stride, which is in turn utilized to generate the display of the map.

It is further noted that the heel portion of the shoe is separated from the toe by a length along an x-axis and the sole is disposed from the heel to the toe. A z-axis is defined as being normal to the sole and a y-axis is defined as being perpendicular to a plane of the z-axis and the x-axis. Using these definitions, the magnetometer is further operable to generate change of direction data based on a detected change in a detected magnetic field along the y-axis. The change of direction data may then be transmitted to the user device and utilized in the generation of the display of the map. The magnetometer may further generate supination data and/or pronation data relating to the shoe based on a detected magnetic field within the plane of the z-axis and the x-axis. Such data may be transmitted to the user device and presented to the user via a user interface thereat.

In addition, the accelerometer may generate a ground contact signal based on a detected ground contact acceleration when the shoe contacts the ground. The magnetometer in this embodiment generates supination data and/or pronation data based on the ground contact signal. Similarly, the ground contact signal and the supination data and/or pronation data are transmitted to the user device for display to the user via one or more user interfaces.

A non-transitory computer executable apparatus comprising a plurality of instructions which are configured to, when executed by a processor, enable a user to complete an untethered workout, are also enabled via the herein-disclosed apparatus and methods. Specifically, instructions at an electronic assembly associated to a shoe are provided which cause a magnetometer associated to the shoe (which is worn by the user during the workout) to determine a plurality of direction data relating to a direction of movement of the shoe during the workout, cause an accelerometer associated to the shoe to determine a plurality of acceleration data relating to an acceleration of the shoe during the workout, and cause a transceiver associated to the shoe to transmit the plurality of direction data and the plurality of acceleration data to a user device. In one variant, the user device utilizes the plurality of direction data and acceleration data to generate a display of a map indicating traversal of a route of the user during the workout.

The herein-disclosed apparatus and methods may enable an application defined by a method for generating a map of a user's workout via only information obtained from an electronic system associated to a shoe worn by the user during the workout. To provide the untethered experience, a plurality of direction data relating to a direction of movement of the shoe during the workout is determined via a magnetometer associated to the shoe. Next, a plurality of acceleration data relating to an acceleration of the shoe during the workout is determined via an accelerometer of the electronic system associated to the shoe. Finally, the plurality of direction data and acceleration data are transmitted to a user device via a transceiver of the electronic system associated to the shoe. The user device utilizes the direction and acceleration data to generate a map of the user's workout, which is displayed to the user via an interface of the user device.

In summary, a problem with the current system and method for tracking a user's movement when running is that it requires them to be tethered. In general, an electronic device such as a smart phone (or other GPS enabled device) is required in order to track a user's movements, which presents several problems. One problem is that running while carrying an electronic device requires the device to physically be carried by the user, possibly at the expensive of another item such as a water bottle or keys. Another problem is that most electronic devices that are used to track movements are expensive, fragile, and expensive to replace.

The present invention removes these problems by eliminating the need for an electronic device altogether. A magnetometer and accelerometer can be used in a shoe in order to track direction of movement as well as acceleration. After completing a run, a user can then use an electronic device at their convenience to retrieve the data from a transceiver in the shoe.

After retrieving the data, the electronic device can use the movement and acceleration data to create a map for the user. The map can give the user information about distance, time, and speed associated with a run. Additionally, the magnetometer can simultaneously track pronation or supination data that may be utilized to evaluate form or problems that occur while running.

The herein described applications improve the functioning of the user device and/or shoe pod by enabling these to associate a user's workout to a map of a route thereof via collected acceleration and magnetometer data. Devices that are able to utilize acceleration and magnetometer data to provide a means for determining a user's route as disclosed herein can operate to more efficiently enable an untethered workout experience.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

It will also be appreciated that the various ones of the foregoing aspects of the present disclosure, or any parts or functions thereof, may be implemented using hardware, software, firmware, tangible, and non-transitory computer readable or computer usable storage media having instructions stored thereon, or a combination thereof, and may be implemented in one or more computer systems.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed as new and desired to be protected by Letters Patent of the United States is:

1. A shoe comprising:
   a heel portion;
   a toe portion;
   a sole portion; and
   an electrical assembly comprising at least:
      a magnetometer configured to continuously monitor the magnetic field, and to determine a direction of movement of said shoe based on a magnetic field and generate timestamped direction chunks;
      an accelerometer configured to determine acceleration of said shoe for each step based on ground contact and generate step-based acceleration chunks: and wherein said timestamped direction chunks and said step-based acceleration chunks are transmitted to a user device for processing.

2. The shoe of claim 1, wherein said electrical assembly further comprises a transceiver apparatus configured to wirelessly transmit said timestamped direction chunks and said step-based acceleration chunks to said user device.

3. The shoe of claim 1, wherein:
   said heel portion is separated from said toe portion by a length along an x-axis;
   said sole portion is disposed from said heel portion to said toe portion;
   a z-axis is disposed normal to said sole portion;
   a y-axis is disposed perpendicularly to a plane of said z-axis and said x-axis; and
   said magnetometer is further operable to generate change of direction data based on a detected change in the magnetic field along said y-axis, said change of direction data being transmitted to said user device.

4. The shoe of claim 3, wherein said magnetometer is further configured to generate supination data and/or pronation data relating to said shoe based on the magnetic field within the plane of said z-axis and said x-axis.

5. The shoe of claim 1, wherein:
   said accelerometer is further configured to generate a ground contact signal based on a detected ground contact; and
   said magnetometer is further configured to generate supination data and/or pronation data based on said ground contact signal;
   wherein said ground contact signal and said supination data and/or the pronation data are transmitted to said user device.

6. A method for tracking a workout via only information obtained from an electronic system associated to a shoe worn by a user during said workout, said method comprising:
   continuously monitoring a magnetic field via a magnetometer associated to said shoe:
   determining a plurality of direction data relating to a direction of movement relative to the magnetic field;
   generating a plurality of timestamped direction chunks based on the plurality of direction data relating to the direction of movement relative to the magnetic field;
   determining a plurality of acceleration data relating to an acceleration of said shoe during said workout via an accelerometer of said electronic system associated to said shoe;
   generating a plurality of step-based acceleration chunks based on a plurality of ground contact signals in the plurality of acceleration data relating to the acceleration of said shoe during said workout; and
   transmitting said plurality of timestamped direction chunks and said plurality of step-based acceleration chunks to a user device via a transceiver of said electronic system associated to said shoe.

7. The method of claim 6, further comprising:
   causing said transceiver of said electronic system associated to said shoe to wirelessly transmit said plurality of timestamped direction chunks and said plurality of acceleration data to said user device.

8. The method of claim 6, further comprising:
   causing said magnetometer to generate change of direction data based on a detected change in the magnetic field in an axis perpendicular to at least one plane of said shoe; and
   causing the transceiver of the electronic system associated to said shoe to transmit said change of direction data to said user device.

9. The method of claim 8, further comprising causing said magnetometer to generate supination data and/or pronation data relating to said shoe based on said magnetic field within said at least one plane.

10. The method of claim 6, further comprising:
    causing said accelerometer to generate a first ground contact signal; and
    causing said magnetometer to generate a first supination data and/or a first pronation data based on said first ground contact signal.

11. The method of claim 6, wherein transmitting said plurality of timestamped direction chunks and said plurality of step-based acceleration chunks to the user device occurs after the workout.

12. A user device, comprising:
    a processor; and
    a non-transitory computer-readable medium comprising a plurality of instructions that are configured to, when executed by the processor, cause the user device to:
       continuously monitor a magnetic field using a magnetometer associated with a shoe;
       obtain timestamped direction chunks from said magnetometer associated with the shoe;
       obtain step-based acceleration chunks from an accelerometer associated with the shoe;
       generate segment chunks from the timestamped direction chunks and the step-based acceleration chunks; and
       display a map indicating a route of a user during a workout based on the segment chunks.

13. The user device of claim 12, wherein the user device comprises a wireless interface; and
    wherein the plurality of instructions are further configured to, when executed by the processor, cause the user device to:
       connect to a transceiver of the shoe; and
       receive the timestamped direction chunks and the step-based acceleration chunks therefrom.

14. The user device of claim 12, wherein the plurality of instructions are further configured to, when executed by the processor, cause the user device to:
 obtain supination data and pronation data from the magnetometer associated with the shoe; and
 display the supination data and the pronation data.

15. The user device of claim 14, where the supination data and the pronation data correspond to a ground contact signal generated by the accelerometer associated with the shoe.

16. The user device of claim 12, where the segment chunks each comprise a distance and direction traveled per stride.

17. The user device of claim 12, where the segment chunks each further comprise a supination data or a pronation data.

* * * * *